Sept. 25, 1928.                J. R. C. SMITH                1,685,686
                        HANDLE FOR STEERING WHEELS
                            Filed April 26, 1927

Patented Sept. 25, 1928.

1,685,686

UNITED STATES PATENT OFFICE.

JOHN REGINALD CRISPIN SMITH, OF VICTORIA, BRITISH COLUMBIA, CANADA.

HANDLE FOR STEERING WHEELS.

Application filed April 26, 1927. Serial No. 186,780.

My invention relates to improvements in handles for steering wheels in which a handle is attached to a steering wheel by means of an adjustable band or clamp. A handle being most convenient in cases where it is necessary to revolve the wheel through a large angle as in cars using balloon tires and the objects of my improvement are, first, to provide an easily attached and free rotatable handle securely clamped to a steering wheel without marring the wheel, second, to provide for the use of the same band or clamp on steering wheel rims or spokes of different shapes and circumferences.

I attain these objects by the device illustrated in the accompanying drawing, in which—

Figure 1:
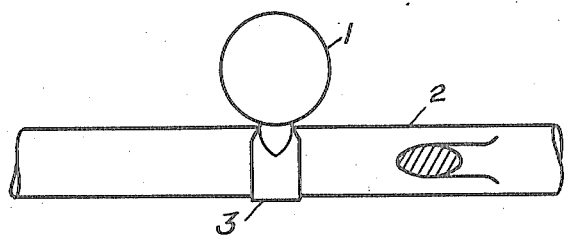
Fig. 1 is a vertical elevation of the handle clamped in position on the steering wheel rim.
Figure 2:
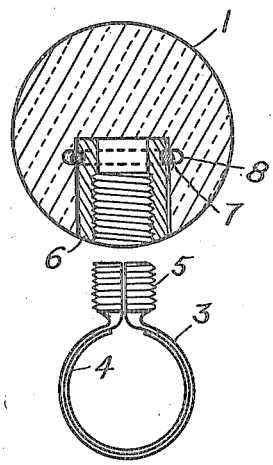
Fig. 2 is a vertical elevation of the clamp and a vertical section of the handle.
Figure 3:
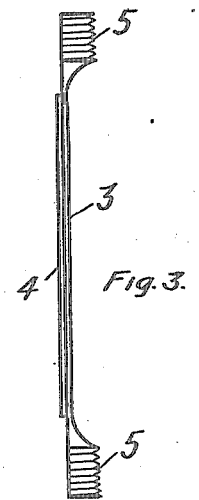

Fig. 3 a side view of the clamp before it is bent around the rim or spoke.

Similar numerals refer to similar parts throughout the several views.

The handle 1 is rotatably attached to the band 3, and by bending the band 3 around the rim 2 of the steering wheel and screwing down the sleeve 6 the band is tightened on the rim, the band 3 being flexible adjusts itself to varying shapes of rim, and different circumferences of rim are taken by the distance the sleeve is screwed on to the split threaded end 5. A strip of leather, felt or other suitable cushioning and gripping material 4 is attached to the inner side of the band next to the rim. The recess 8 in the handle contains an unjoined annular spring ring 7 adjusted to engage in the recess provided in the sleeve when the handle is forced on the sleeve, and the annular ring and sleeve recess are so proportioned that the handle can be attached or detached from the sleeve by suitable pressure.

I claim:

1. In a steering wheel, a handle, an adjustable flexible band with a half round threaded end at each end thereof, a cushioning strip attached to said band, a threaded sleeve, a recess in said handle, a recess in said sleeve, and an annular spring ring.

2. The combination of a steering wheel, a handle formed with an opening closed at its inner end, an internally threaded sleeve fitting in the opening, spring means between the outer wall of the sleeve and the inner wall of the opening to secure said sleeve in said opening, and a flexible band having its ends enlarged and threaded to embrace the handle, the threaded enlarged ends when brought together forming a thread stud to engage the internal threads in the sleeve.

JOHN REGINALD CRISPIN SMITH.